United States Patent [19]

Levin

[11] Patent Number: 4,668,493

[45] Date of Patent: May 26, 1987

[54] PROCESS FOR MAKING SILICON

[76] Inventor: Harry Levin, 19831 Friar St., Woodland Hills, Calif. 91367

[21] Appl. No.: 749,661

[22] Filed: Jun. 28, 1985

Related U.S. Application Data

[63] Continuation-in-part of Ser. No. 390,920, Jun. 22, 1982, abandoned.

[51] Int. Cl.$^4$ ............................ C01B 33/02; B01J 8/08
[52] U.S. Cl. .................................... 423/349; 422/129; 422/158; 422/209; 422/241; 156/DIG. 64; 423/350
[58] Field of Search ................. 423/349, 350; 422/129, 422/158, 209, 241; 156/DIG. 64

[56] References Cited

U.S. PATENT DOCUMENTS

| 4,132,763 | 1/1979 | Schmidt et al. | 423/349 |
| 4,342,284 | 8/1982 | Loser et al. | 118/716 |
| 4,343,772 | 8/1982 | Levin et al. | 422/200 |

OTHER PUBLICATIONS

Nanis et al., "Novel Duplex Vapor Electro Chemical Method for Silicon Solar Cells," DOE/JPL 954471-79/12, Quarterly Report, No. 15, 11/30/1979.
Kapur et al., "Novel Duplex Vapor-Electrochemical Method for Silicon Solar Cells," ERDA/JPL 954471-77/3, Quarterly Report, No. 11, 10/31/1978.

*Primary Examiner*—Andrew H. Metz
*Assistant Examiner*—Chung K. Pak
*Attorney, Agent, or Firm*—Donald L. Johnson; John F. Sieberth; Robert A. Linn

[57] ABSTRACT

A reactor apparatus (10) adapted for continuously producing molten, solar grade purity elemental silicon by thermal reaction of a suitable precursor gas, such as silane (SiH$_4$), is disclosed. The reactor apparatus (10) includes an elongated reactor body (32) having graphite or carbon walls which are heated to a temperature exceeding the melting temperature of silicon. The precursor gas enters the reactor body (32) through an efficiently cooled inlet tube assembly (22) and a relatively thin carbon or graphite septum (44). The septum (44), being in contact on one side with the cooled inlet (22) and the heated interior of the reactor (32) on the other side, provides a sharp temperature gradient for the precursor gas entering the reactor (32) and renders the operation of the inlet tube assembly (22) substantially free of clogging. The precursor gas flows in the reactor (32) in a substantially smooth, substantially axial manner. Liquid silicon formed in the initial stages of the thermal reaction reacts with the graphite or carbon walls to provide a silicon carbide coating on the walls. The silicon carbide coated reactor is highly adapted for prolonged use for production of highly pure solar grade silicon. Liquid silicon (20) produced in the reactor apparatus (10) may be used directly in a Czochralski or other crystal shaping equipment.

9 Claims, 4 Drawing Figures

PROCESS FOR MAKING SILICON

ORIGIN OF THE INVENTION

The invention described herein was made in the performance of work under NASA Contract No. NAS7-100 and is subject to the provisions of Section 305 of the National Aeronautics and Space Act of 1958 (72 Stat. 435; 42 U.S.C. 2457).

CROSS-REFERENCE

This application is a continuation-in-part of Application Ser. No. 390,920, filed June 22, 1982, now abandoned.

BACKGROUND OF THE INVENTION

1. Field of the Invention

The present invention is directed to a process and apparatus for making solar and semiconductor grade silicon by thermal reaction of a suitable precursor gas composition. More particularly, the present invention is directed to a process and apparatus for continuous production of solar and semiconductor grade silicon in the liquid phase, by thermal decomposition of a suitable precursor gas, such as silane.

2. Description of the Prior Art

As is well known, highly pure elemental silicon properly doped with minute quantities of suitable doping agents, is the most widely used semiconductor and solar cell material. In view of the recent trend of increasing reliance on solar energy, there exists a significant demand for solar cell grade silicon at a reasonable cost. In fact, the present unavailability of solar cell grade silicon at a reasonable cost represents the principal factor which presently still renders solar cells too expensive for large-scale electrical power generation.

Solar cell or semiconductor grade (hereinafter solar grade) silicon is usually manufactured in a two-step process. First, solid silicon compounds abundantly available from the Earth's crust (such as $SiO_2$) are converted into gaseous or low boiling liquid silicon compounds such as silicon tetrachloride ($SiCl_4$), trichlorosilane ($SiHCl_3$) and silane ($SiH_4$). The gaseous or liquid silicon compounds are then relatively readily purified by fractional distillation or like processes.

In the next step of preparing elemental silicon of solar grade purity, the purified silicon compound is reacted in gaseous phase to yield elemental silicon and usually a gaseous by-product. For example, silane gas is thermally decomposed in accordance with Equation I to yield silicon and hydrogen gas.

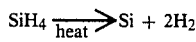

$$SiH_4 \xrightarrow{heat} Si + 2H_2 \qquad \text{Equation I}$$

The above-summarized processes have, hitherto, been performed in the prior art to yield solid elemental silicon. Often the processes yield very low overall-density agglomerated particles of silicon, which are hard to handle in an efficient and continuous manner. Other examples of problems associated with the gas-to-solid thermal reaction processes are: undesirable deposition of a hard silicon crust on the reactor walls, and frequent interruption of the process due to the above-noted and other problems. For example, in accordance with the most widely used prior art modified Siemens process for chemical preparation of solar grade silicon, elemental silicon is grown epitaxially on the surface of rods disposed in a reactor wherein trichlorosilane ($SiHCl_3$) and hydrogen ($H_2$) gases are reacted. However, even this process must be interrupted from time to time in order to remove the solid silicon deposited on the rods, and to clean the reactor.

Another significant disadvantage of the prior art chemical processes for the preparation of solid silicon is that the resulting product is usually not sufficiently large grain crystalline to be directly suitable for semiconductor or solar cell applications. Therefore, the solid silicon produced by the prior art processes must be melted in a separate step and converted in a Czochralski or like crystal pulling apparatus into large grain crystalline (ideally monocrystalline) ingots, ribbons and the like. Thus, as is will appreciated by those skilled in the art, the overall prior art processes for preparing silicon solar cells require an undesirably high input of energy.

In addition to impurities, the new processes have another formidable problem; namely, how to limit or control the unwanted gas phase production of submicron silicon particles which are characterisitic of the thermal decomposition, or pyrolysis, of silicon compounds, especially silane. Two reactions occur in the pyrolysis of a silicon hydride or halide:

(a) homogeneous decomposition reaction to produce fine powder of average particle size of about 0.1 micron; and
(b) heterogeneous decomposition on solid surfaces to produce chemical vapor deposition (CVD) silicon with a metallic appearance.

Fine powder problems have delayed the development of various silicon processes using silane.

In order to overcome or alleviate the above-noted problems, a few attempts were made in the prior art to obtain molten, rather than solid, silicon in the thermal reaction process. For example, Japanese patent application laid open for public inspection on Dec. 2, 1977, Ser. No. 52-144959, describes a process wherein a bath of molten silicon (obtained from previously-prepared solid silicon of high purity) is maintained in a reaction vessel wherein trichlorosilane ($SiHCl_3$) or silicon tetrachloride ($SiCl_4$) and hydrogen gas ($H_2$) are reacted. The silicon tetrachloride ($SiCl_4$) or trichlorosilane ($SiHCl_3$) is heated to 300°–500° C., and the hydrogen gas ($H_2$) is heated to 1200°–1600° C. prior to introduction into the reaction vessel. The temperature is maintained in the gas containing part of the reaction vessel between 1050° to 1150° C. so that solid elemental silicon is formed in the vessel by the reaction of the gases. The solid silicon, however, falls into the bath of molten silicon where it melts.

A readily apparent disadvantage of the just-described process is that it is not suitable for production of silicon from silane ($SiH_4$), because silane would already start significant thermal decomposition while being preheated prior to introduction into the reaction vessel. Furthermore, the reactants used in the process provide elemental silicon only in a relatively low yield. Still further, the process is batchwise, rather than continuous, in the sense that the gaseous reactants must be allowed to dwell in the reactor for a relatively long time to reach equilibrium. Perhaps for these and other reasons, according to the best knowledge of the present inventor, this prior art process has not gained even moderate industrial acceptance.

U.S. patent application Ser. No. 126,063 filed on Feb. 29, 1980, now U.S. Pat. No. 4,343,772, represents an attempt for production of molten silicon in a continuously operating reactor by thermal reaction of a suitable silicon containing precursor gas. In accordance with this disclosure, a precursor gas, such as silane, flows in an outer, forwardly moving vortex in a spiral flow reactor. A by-product gas, such as hydrogen, moves in an inner, rearwardly moving vortex. The walls of the reactor are maintained at a temperature above the melting point of silicon. Molten silicon flows downwardly on the walls of the reactor to collect in a pool wherefrom it is removed. A cooled injector probe having an internal diameter of about 0.06 inches is utilized to introduce the precursor gas tangentially relative to the interior cylindrical surface of the reactor. A vortex finder tube is disposed substantially in the center on the top of the reactor to remove the rearwardly moving vortex of the by-product gas.

The reactor described in the above-noted patent application, although designed to operate continuously for the production of molten silicon, is far from free of problems. More specifically, the injector tube is subject to frequent clogging due to formation of a solid silicon plug therein, and the emitted by-product gas contains a relatively large quantity of finely dispersed solid silicon particles.

The operation described in U.S. Pat. No. 4,343,772 results in thermal precipitation of silicon powder onto the probe inside the reactor. A nonmetal solid coating forms thereon and builds outwardly from the cooled probe, getting warmer as it extends. Eventually, the tip of the coating grows far enough from the probe so that its surface melts and wets. Thereafter, a capillary action phenomenon pulls liquid silicon back toward the cooled probe whereupon more solidification occurs, eventually resulting in plugging of the relatively small probe orifice. The significance of conversion of gas to solid prior to melting of silicon was unrecognized.

The location of the "vortex finder" near the top of the reactor and near the silane injector probe in U.S. Pat. No. 4,343,772, has contributed heavily to the loss of fines by delivering fine brown powder silicon out of the system. Also, the off center entrance of the cold silane probe into the extremely hot reactor caused large thermal stresses which resulted in cracking and sealing problems. The process of U.S. Pat. No. 4,343,772 limits silicon production because the gas entry and gas take-off are both at the top of the reactor. In cyclones of this design, there is an optimum length for centrifugation, as dictated by entering conditions and reversal of flow in going from outer vortex to inner vortex. Additional length loses the ability to produce additional effective cyclonic turns and is non-productive. The velocity of the gas entering the reactor in U.S. Pat. No. 4,343,772 is usually in the hundreds of feet per second.

Additional disclosures relating to the preparation of solar grade silicon are found in the following printed publications: Low-Cost Solar Array Project 5101-87, "Silicon Formation by Pyrolysis of Silane," Interim Report of the Continuous Flow Pyrolyzer Study, by H. Levin, Jet Propulsion Laboratory, California Institute of Technology, October 1978, and "Compatibility Studies of Various Refractory Materials in Contact with Molten Silicon," by O'Donnell et al., Jet Propulsion Laboratory, California Institute of Technology, March 1978 (JPL Publication 78-18).

In light of the foregoing, there still is a serious want in the prior art for a continuously operable efficient process and apparatus for chemically preparing molten silicon from a gaseous starting material. The present invention provides such a process and apparatus.

SUMMARY OF THE INVENTION

It is an object of the present invention to provide an apparatus and process for the efficient continuous production of molten silicon from a suitable silicon containing precursor gas.

It is another object of the present invention to provide an apparatus for the continuous production of molten silicon which readily withstands prolonged exposure to molten silicon.

These and other objects and advantages are attained by a reactor apparatus wherein a substantially smooth flow of a suitable silicon containing precursor gas is maintained in a substantially axial direction in an elongated reactor heated to a temperature above the melting temperature of elemental silicon. Thermal reaction of the precursor gas directly yields molten silicon which flows down on the walls of the reactor to be removed from a bottom thereof in the liquid state.

According to the process of the present invention a septum allows the use of a large inlet orifice and low velocity entrant flow and thereby more fully utilizes the upper regions of the reactor chamber for silicon conversion. By means of its insulating, high emissivity thermal properties, the septum eliminates the possibility of brown powder deposition on a relatively cooler surface, which is the starting step in the plugging of the inlet orifice.

In known silane decomposition processes, solid submicron silicon is formed and can cause plugging where small orifices and cooled surfaces are present.

In important distinction from the process described in U.S. Pat. No. 4,343,772, the present inventive process permits use of a reactor of any length since no toroidal flow is needed.

In accordance with one aspect of the present invention, an inlet tube of the reactor which injects the precursor gas into the reactor is efficiently cooled to prevent thermal formation of silicon prior to entry of the precursor gas into the reactor. One side of a relatively thin septum attached to the inlet tube is substantially in the same temperature range as the inlet tube, while the other side of the septum is exposed to the interior of the reactor and is substantially in the same temperature range as the reactor. As a result, the precursor gas entering the reactor is subjected to a very quick transition in temperature with substantially total avoidance of clogging the inlet tube by formation of a solid silicon plug.

The precursor gas is admitted to the reactor at comparatively low velocity, the very high inlet velocities not being required as set forth or implied in U.S. Pat. No. 4,343,772. A suitable range of velocities for the present invention is 1 to 50 feet per second, preferably 1 to 10 feet per second, more preferably 3 to 10 feet per second. Thus for the 157 cm by 7.6 cm cylindrical reactor described more fully below, a 1.0 cm inlet orifice, for example, may be used rather than the 0.15 cm injector probe exit orifice set forth by U.S. Pat. No. 4,343,772. This larger opening is a factor in permitting operation of the reactor without clogging. Furthermore, the inlet orifice of the invention may be positioned at the top center of the reactor, e.g. further from the vertical walls of the reactor. This is of course contrary to the description of U.S. Pat. No. 4,343,772, which places the gas outlet tube (the vortex finder) at top center and the gas inlet tube off center and which requires a gas inlet flow tangential to the vertical wall of the reactor at a velocity high enough to produce swirl and sustain a double-vortical flow pattern in the reactor.

The septum of the inventive process is small in size but has a large and critical role. The septum introduces a precursor gas such as silane which begins to change to solid silicon at about 325° C. into a reactor at temperatures above the melting point of silicon without the occurrence of solid plugging of the gas entry and other untoward effects. The septum is preferably round and wafer-shaped, with a central hole and is preferably made of high porosity carbon. For this reason, highly preferred carbon is Union Carbide Corporation's Carbon 60.

One face of the septum device of the invention "sees" very high temperatures within the reactor where radiation heating controls decomposition of precursor gas and melting of silicon. The other face of the septum is in contact with the relatively cooled gas inlet tube. Preferably, the septum is in face-to-face contact with the gas inlet tube so that the inside diameter holes are matched for smooth gas flow. Thus the septum must be made from a material which has a high emissivity such as carbon or graphite. Other high emissivity materials such as silicon carbide may also be used. Emissivity is the relative power of a surface to radiate heat; i.e., the ratio of the energy radiated by a surface compared to a black body perfect radiator (at the same temperature). The septum of the invention has an emissivity greater than 0.90, preferably greater than 0.95. With such a septum, the process of the invention may be carried out such that fine brown silicon powder cannot deposit stably on the septum surface. Preferred materials are carbon and graphite.

The septum of the invention is formed of a material which has a high insensitivity to thermal shock. The septum or partition, is positioned such that one face is in contact with a prodigious heat sink and the opposite face a prodigious heat source. The septum is sufficiently thin that the gas passes through it rapidly enough so that it does not permit decomposition of the silane before the silane enters the reactor. That is, one face of the septum contacts and covers the flat end face of the gas inlet tube and the other face of the septum preferably sits flush with the reactor chamber top inner wall and constitutes a part of the top wall. Only the thickness of the septum separates the gas inlet tube from the reaction chamber coaxial with it. In the reactor environment where radiation is the main mode of heat transfer, the emissivity of the septum face is comparable to that of the reactor walls. The septum must be kept of a sufficiently small thickness that silane can pass quickly through it without decomposing during the passage. Depending upon the size of the reactor, the precursor gas, and the flow rate of the gas, a suitable range of thickness for the septum is about 0.1 cm to 1.0 cm., preferably 0.2 cm to 0.4 cm; and the diameter of the septum hole may range from 0.5 cm to 3.0 cm.

In accordance with another aspect of the present invention, the walls of the reactor are made of graphite or carbon material which have been discovered to be quickly coated (converted) during the initial exposure of the reactor to liquid silicon with a highly stable silicon carbide layer. Thus, the walls of the reactor, including that portion formed by the septum, quickly become converted to a material which is vastly superior in its ability not to adversely affect the purity of the formed silicon product.

According to the process of the invention, a decomposable precursor gas such as silane enters into a preferably vertical, cylindrical reaction chamber at moderate velocity after passing through a cooled gas inlet tube and the septum in tandem. The precursor gas, upon entering the reactor, has been heated to a temperature only a few degrees above its reservoir temperature and well below its decomposition temperature even though the reactor is operated at temperatures above the melting point of silicon.

Where other silicon-containing gas is used in the precursor gas composition, the composition may be introduced at a higher temperature which is below the decomposition temperature of the silicon-containing gas. Of course carrier gases and diluent gases may also be used in such compositions. Thus the difference between the temperature of the precursor gas composition at entry and the temperature of the reaction chamber may be smaller when other silicon-containing gases are used. For example, $SiCl_4$ could be presented to the reaction chamber at 1000° C. without significant gas decomposition prior to entry into the reaction chamber.

The reactor is preferably coaxial with the gas inlet tube and septum, and preferably incorporates the septum flush with its inner wall at top center. Its component and position relationship is highly advantageous to the successful entry of a readily decomposable, solid-producing gas into an extremely hot reactor without plugging, stress cracking, or otherwise disrupting the reactor operation.

Upon entering the reactor, the precursor gas is subjected to a very quick temperature transition but is maintained in an approximately axi-symmetrical manner of flow down the reactor. The precursor gas heats up and decomposes to produce chemical vapor deposition (CVD) silicon on the reactor wall and fine powder silicon in the reactor free space along with by-product hydrogen gas or other by-product gas depending upon the precursor gas. Also, a carrier or diluent gas such as hydrogen may be transferred through the reactor. The CVD silicon and the powder silicon rapidly liquefy under the intense radiant heat within the reactor. The hydrogen gas and possibly some unreacted precursor gas exit near the bottom of the reactor according to this version of the configuration of the reactor and the species of precursor gas. The liquid silicon collects and is maintained in liquid phase in a reservoir at the bottom of the reactor. The liquid may be drained out of the reactor either continuously or on demand.

In a preferred embodiment, the reactor is a tall-formed, right-cylindrical vessel. It uses carbon or graphite inner walls. The first-made silicon reacts rapidly with the carbon of the inner wall and converts it to silicon carbide. Thereafter, liquid silicon flows down the walls and collects in the reservoir during operation. The gas inlet tube is seated vertically on the septum and coaxially with the reactor to provide a gas flow vertically down the reactor.

The features of the present invention can be best understood, together with further objects and advantages, by reference to the following description, taken in connection with the drawings, wherein like numerals indicate like parts.

DESCRIPTION OF THE PREFERRED EMBODIMENT

A preferred embodiment of the invention is a process for directly producing molten silicon, said process comprising the steps of:

(a) passing a stream comprising silane gas below the decomposition temperature of silane through a high emissivity, thin, insulating septum into a non-contaminating reaction chamber above the melting point of silicon, said thin septum having one face below the decomposition temperature of silane and an opposite face exposed to said reaction chamber, whereby said silane gas is decomposed directly to molten silicon in said reaction chamber;

(b) removing a stream of decomposition hydrogen gas and any unreacted silane from said reaction chamber; and (c) recovering product molten silicon from the bottom of said reaction chamber.

A preferred embodiment of the invention is also a process for directly producing molten silicon by thermal reaction of a silicon-containing precursor gas in a reaction chamber, the process comprising the steps of:

maintaining said silicon-containing precursor in a first temperature range below the thermal decomposition temperature of said silicon-containing precursor gas;

maintaining the reaction chamber in a second temperaure range above the melting point of silicon;

abruptly raising the temperature of said silicon-containing precursor gas from said first temperature range to said second temperature range by introducing said silicon-containing precursor gas into said reaction chamber from a cooled inlet means located outside said reaction chamber through a thin, high emissivity, insulating septum having one face against said cooled inlet means and having the opposite face exposed to said reaction chamber so that said silicon-containing precursor gas remains undecomposed until entering said reaction chamber;

maintaining a substantially smooth axial flow of said silicon-containing precursor gas in the reaction chamber while permitting said silicon-containing precursor gas to undergo thermal decomposition to yield molten silicon;

removing unreacted precursor gas and by-product gas from the reaction chamber, and recovering molten silicon from the reaction chamber.

The following specification taken in conjunction with the drawings sets forth the preferred embodiment of the present invention in such a manner that any person skilled in the chemical arts can use the invention. The embodiment of the invention disclosed herein is the best mode contemplated by the inventor for carrying out his invention in a commercial environment, although it should be understood that various modifications can be accomplished within the parameters of the present invention.

Figures 1, 3:
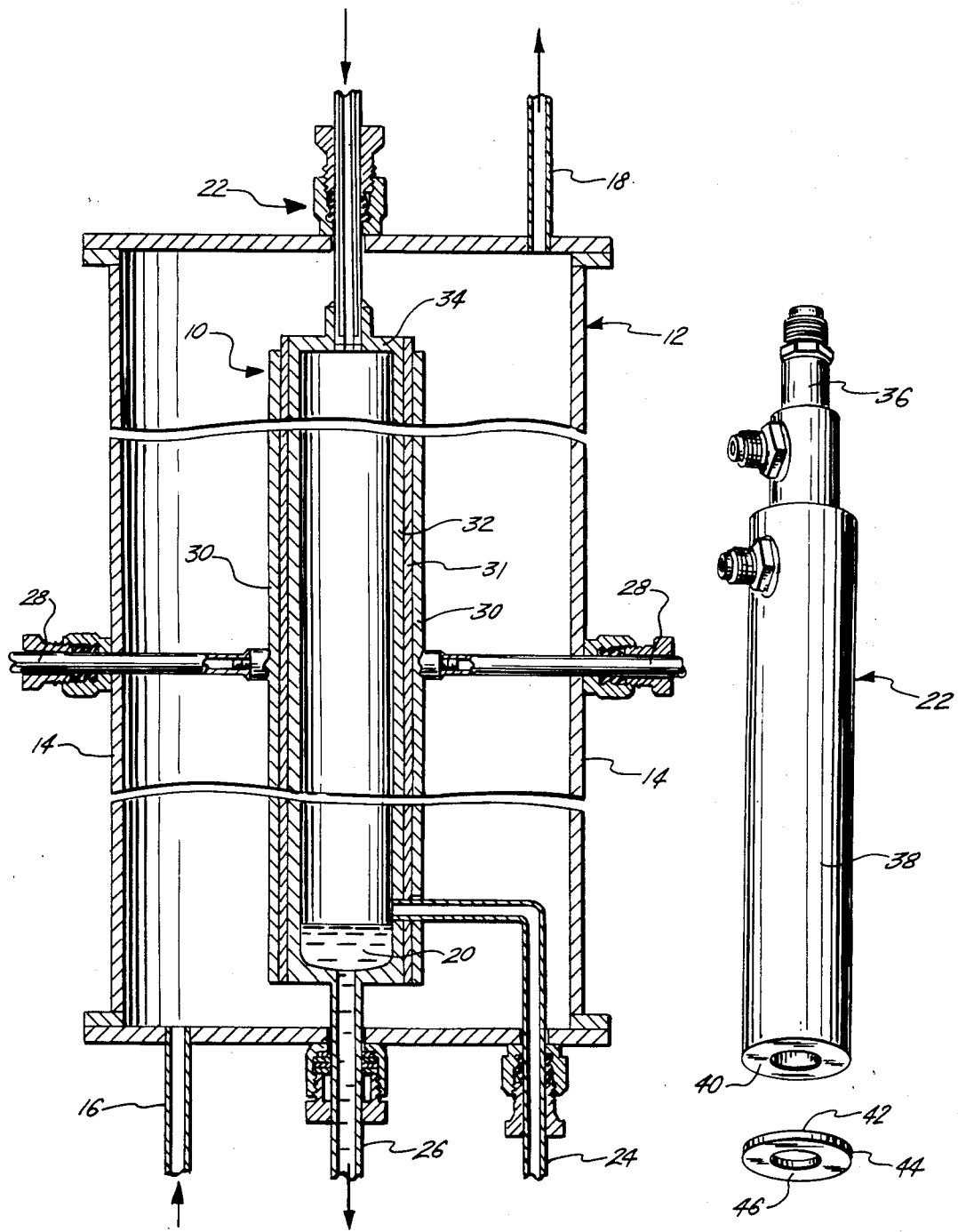
FIG. 1 is a schematic cross-sectional view showing the reactor apparatus of the present invention enclosed in an outer cylinder.
FIG. 3 is a schematic perspective view showing a precursor gas inlet tube assembly to be incorporated in the reactor apparatus of the present invention.
Figure 2:
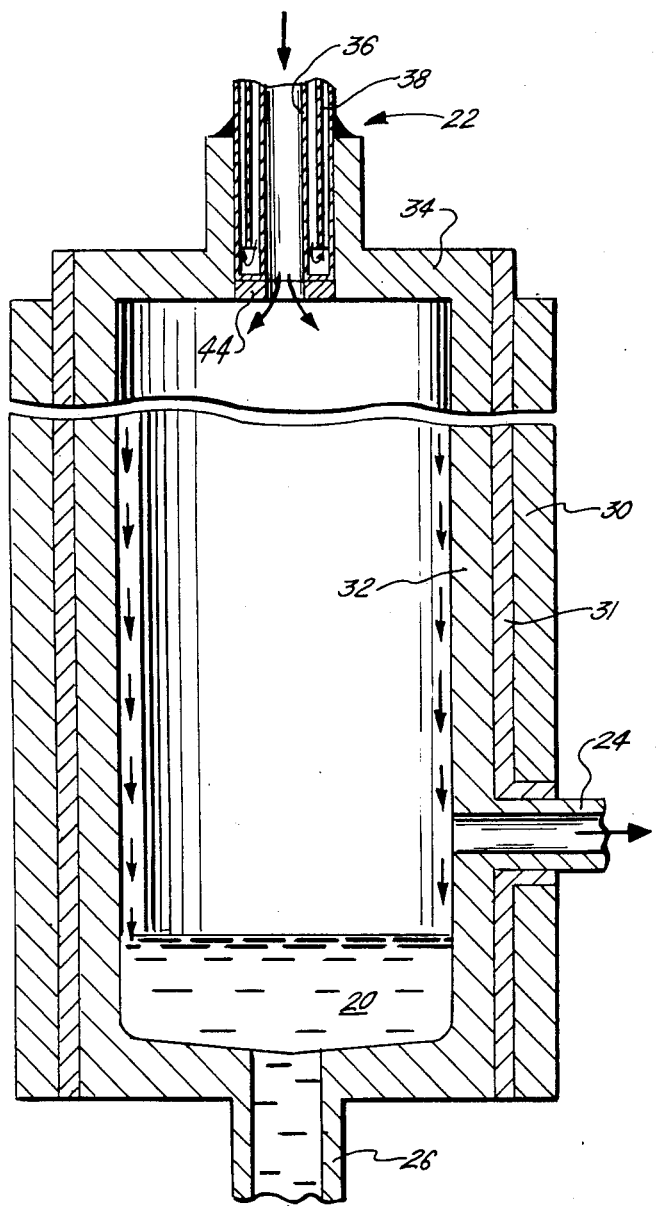
FIG. 2 is a schematic cross-sectional view showing the reactor apparatus of the present invention.

Referring now to the drawing Figures and particularly to the schematic cross-sectional views of FIGS. 1 and 2, the reactor apparatus 10 of the present invention is disclosed. The reactor apparatus 10 of the present invention is adapted for producing high purity molten silicon in a continuous process by thermal reaction of a suitable silicon containing precursor gas composition. Several known chemical reactions may be utilized in the novel process practiced in the reactor apparatus 10. For example, silicon may be produced in the apparatus 10 by reduction of silicon tetrachloride ($SiCl_4$) or trichlorosilane ($SiHCl_3$) with hydrogen ($H_2$) in accordance with Equations II and III respectively.

$SiCl_4 + 2H_2 \rightarrow Si + 4HCl$   Equation II $SiHCl_3 + H_2 \rightarrow Si + 3HCl$   Equation III However, the apparatus 10 and process of the present invention is designed most advantageously for continuous production of silicon by thermal decomposition of silane gas into silicon and hydrogen gas in accordance with Equation I (set forth above). Therefore, the following exemplary description principally describes the utilization of the thermal decomposition reaction of silane in the novel apparatus and process of the present invention. Furthermore, hereinafter the term "precursor gas" is interchangeably used with the term "silane," and the term "by-product gas" is interchangeably used with the term "hydrogen." Nevertheless, it should be kept in mind that in the event the process of the present invention utilizes alternative chemical reactions (such as the reactions of Equations II or III), the precursor gas may be other than silane, and the by-product gas or gases may be other than hydrogen.

Referring now principally to FIG. 1, the reactor apparatus 10 of the present invention is shown mounted in a suitable outer cylinder 12. The principal purpose of the outer cylinder 12 is to contain the reactor apparatus 10 in an inert gas atmosphere while the reactor apparatus 10 is heated to high temperatures. The outer cylinder 12 may be constructed substantially in accordance with the state-of-the-art. The outer cylinder 12, of course, also provides thermal insulation for the reactor apparatus 10, and for that purpose walls 14 are made of stainless steel encasing suitable insulating materials (not shown) which surround the reactor apparatus 10. Inlet and outlet tubes for the inert gas, which is preferably argon, are schematically shown on FIG. 1 and bear the reference numerals 16 and 18, respectively.

The protective outer cylinder 12 also has suitable inlet ports for ducts carrying the precursor gas, the by-product gas, and the reaction product, molten silicon 20. On the schematic view of FIG. 1, the inlet duct assembly for the precursor gas silane bears the reference numeral 22, the outlet duct for the by-product hydrogen the reference numeral 24, and the outlet duct for molten silicon the reference numeral 26. Finally, the outer cylinder 12 is provided with suitable entry ports for copper or like conduits 28 which conduct current for energizing graphite "picket fence" type resistance heaters 30 surrounding the inner reactor apparatus 10. The resistance heaters 30 and the inner reactor 32 are separated from one another by a high-temperature-resistant electrical insulator 31.

Referring now principally to the schematic cross-sectional view of FIG. 2, the inner reactor apparatus 10 is disclosed in detail. The reactor apparatus is an elongated hollow body; preferably, as is shown in the herein-described preferred embodiment, it is a hollow cylindrical body the length of which greatly exceeds its diameter. In a specific example of the reactor apparatus 10 of the present invention, the cylindrical reactor body or reactor 32 is 157 cm long, and has an inner diameter of 7.6 cm. The length-to-width ratio of the reactor may vary over a wide range so long as molten silicon is produced and decomposition gas is removed. A suitable range is at least about 2:1 or higher. The relative length-to-width ratio of the reactor 32 is designed to provide a sufficiently long dwelling time for the gaseous reactants in the reactor 32 to reach thermodynamic equilibrium, which, under the conditions prevailing in the reactor 32, favors high yields of elemental silicon. In fact, in the apparatus of the present invention, silane gas is converted in substantially one hundred percent (100%) yield to silicon.

In the cyclone apparatus of U.S. Pat. No. 4,343,772 the length-to-width ratio is limited to optimum length dictated by reverse flow considerations. Additional length therein is ineffective and nonproductive. The throughput of the present invention is not so limited.

In accordance with one important aspect of the invention, the reactor 32 is made of highly pure graphite or carbon material which rapidly reacts under the conditions prevailing in the reactor 32 with silicon to form silicon carbide (SiC). In fact, it was found in experience that the silicon formed in the initial stages of the operation of the reactor apparatus 10 is substantially consumed to react with the inner walls of the reactor 32. The resulting silicon carbide coating on the reactor walls is highly wettable by molten silicon, and is yet highly resistant to molten silicon. This is a very advantageous feature of the reactor apparatus 10 of the present invention, because it permits the formation of highly pure solar grade silicon substantially uncontaminated by material dissolved from the reactor walls.

For comparison, it is noted that liquid silicon is known in the art to be highly reactive and is often termed a "universal solvent." In fact, most prior art silicon crystal pulling apparatus struggle with the problem of keeping molten silicon sufficiently free of impurities formed when the liquid silicon reacts with, dissolves, or diffuses impurities out from the walls of a crucible, capillary die, or the like. The present invention, however, completely solves this problem by providing the readily available graphite or carbon reactor material, which during the process of the invention "self-converts" into the highly durable and liquid-silicon-resistant silicon carbide. The initial stage of converting the carbon walls of the reactor 32 into silicon carbide is termed "priming" of the reactor.

Heating of the reactor body 32 is accomplished by the "picket fence" type resistant heaters 30 which surround the reactor body 32. In alternative embodiments of the reactor apparatus 10 of the present invention, other methods of heating may be utilized. The only critical feature of the invention regarding heating is that the interior of the reactor 32 and the interior walls are maintained above the melting temperature of silicon (1412° C.) during the process of silicon production. Preferably, the interior of the reactor 32 is maintained above 1500° C., and most preferably it is maintained approximately between 1600° to 1800° C. At the operating temperatures of the reactor apparatus 10 (i.e., above 1412° C.), the thermal decomposition of silane gas into silicon and hydrogen is extremely rapid. Furthermore, at this temperature the thermodynamic equilibrium favors formation of elemental silicon with substantially one hundred percent (100%) yield.

Actually, the above-noted upper limit of approximately 1800° C. is not a limit of the process of the present invention, because the process may be practiced at still higher temperatures. Rather, approximately 1800° C. is the upper limit of temperature that the materials of the reactor apparatus 10 of the present invention can withstand without damage in indefinite continuous operation.

With regard to the above-noted temperature ranges of the process of the present invention, it is further noted that conversion of the carbon or graphite walls of the reactor 32 to silicon carbide occurs below 1300° C. too slowly to have any practical effect on priming the reactor 32. Therefore, in the prior art reactors operating at temperatures below 1300° C., the very advantageous "priming" of the reactor does not occur to a useful extent.

Experience proved the reactor apparatus 10 of the present invention to be capable of withstanding repeated temperature cycling between ambient temperature (nonoperational time of the reactor) and 1400°–1800° C. (operation).

CVD silicon is formed on the walls of reactor 32 and fine silicon powder is formed in the free space within the reactor. Residence time within the reactor environment is sufficient to melt the fine powder silicon and transport it to the walls or directly to the reservoir of liquid silicon at the bottom of the reactor 32. In very short versions of the reactor, the melting of the powder may be aided by a transverse filter or a baffle intercepting the powder stream within the reactor so that little or no silicon powder can escape the reactor.

The silicon formed in the reactor 32 is in the molten phase, and flows down the silicon carbide interior walls of the reactor 32 to collect in the bottom thereof. In a preferred operation, pure, solar grade molten silicon is drained from the bottom of the reactor 32 and is advantageously utilized, without being allowed to solidify, in a Czochralski or other crystal shaping equipment (not shown) to provide silicon ingots or ribbons (not shown).

Preferably, the reactor apparatus 10 is disposed in a substantially upright position, as is shown on FIGS. 1 and 2, so that flow of the molten silicon 20 on the reactor walls is gravity induced. The reactor is preferably operated with a smooth axial flow of the precursor gas composition from the top toward the bottom of the reactor. Alternatively, the gas could be flowed from the bottom toward the top of the reactor as molten silicon flows downwardly to collect at the bottom of the reactor.

Figure 4:
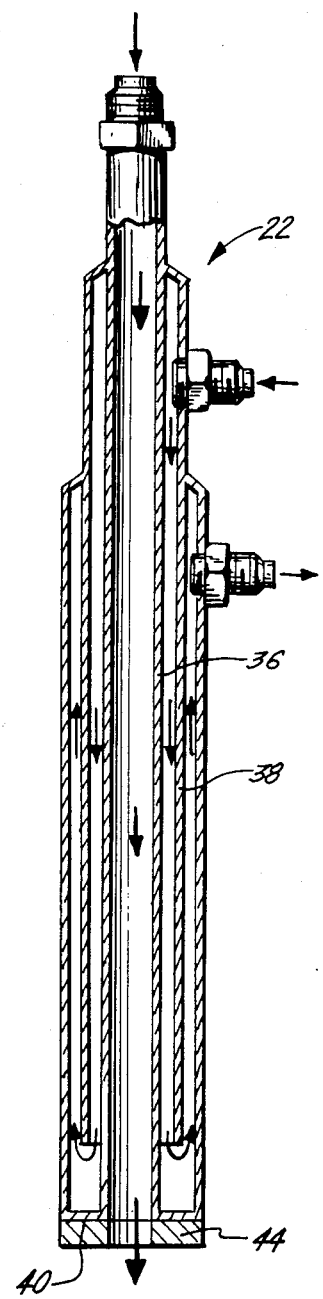
FIG. 4 is a cross-sectional view showing the precursor gas inlet tube assembly to be incorporated in the reactor apparatus of the present invention.

Referring now principally to FIGS. 3 and 4, the silane gas inlet duct or tube assembly 22 is disclosed in detail. The inlet tube assembly 22 is particularly adapted and highly suited for supplying silane gas into the reactor 32 in a continuous and substantially nonclogging manner. As is shown on FIG. 2, the inlet tube assembly 22 is disposed substantially in the center of a top wall 34 of the reactor 32 in such a manner that the inlet tube assembly 22 is located outside of the heated interior space of the reactor 32.

The inlet tube assembly 22 comprises an elongated inlet tube 36 which is connected to a supply of silane gas. The inlet tube 36 is surrounded by a jacket 38 wherethrough a cooling medium, such as water, is circulated. The end of the inlet tube 36 and the end of the jacket 38 together form a substantially flat substantially ring-shaped surface 40.

The ring-shaped surface 40 of the inlet tube assembly 22 is not directly exposed to the interior of the reactor 32. Rather, it is in contact with one side 42 of a carbon or graphite septum 44. The septum 44 comprises a relatively thin ring-shaped body which substantially conforms to the shape of the end of the inlet tube assembly 22. A second side 46 of the septum 44 is substantially flush with the interior surface of the top wall 34 of the reactor 32, as is shown on FIG. 2.

The septum 44 insulates the inlet tube 36 from the high temperature of the reactor 32 and causes the silane gas which enters the reactor 32 to experience a very sharp temperature gradient. This is because one side 42 of the septum 44 is in contact with the efficiently cooled surface 40 of the inlet tube 36 and jacket 38, and is substantially in the same temperature range as the inlet tube 36. The other side 46 of the septum 44 is exposed to the heated interior of the reactor 32, and, being of a dark high emissivity material (porous carbon), is substantially in the same temperature range as the interior of the reactor 32.

During the process of the present invention, silane gas is continuously fed through the inlet tube assembly 22 into the reactor 32. The inlet tube assembly 22 is vigorously cooled by water circulated through the cooling jacket 38. In accordance with one important aspect of the present invention, the temperature of the silane gas introduced into the reactor 32 through the inlet tube 36 is kept at a temperature below 300° C. This is for the purpose of avoiding any significant thermal decomposition of the silane gas prematurely, before entry of the silane gas into the reactor 32. In order to facilitate efficient cooling of the inlet tube assembly 22, the inlet tube 36 and the jacket 38 are made of a material of high thermal conductivity, such as copper.

A wide range of smooth, laminar flow rates are usable according to the process of the invention. The flow rate should be at least enough to provide a reasonable throughput for the reactor and not so high as to cause cool zones or cool portions of reactor wall. Also the flow rate should not be so high as to interfere with removal of molten silicon from the bottom of the reactor and withdrawal of decomposition and other gases. A suitable flow rate for the gas is at least 0.02 cubic feet per minute (cfm) (0.6 liters gas per minute) STP up to a maximum flow rate, depending on the size of the reactor, wherein the operation of the reactor is not affected. A suitable range of linear gas velocity is about 1.0 to 50 feet per second (fps) most preferably 3 to 10 fps.

The relatively thin septum 44 of carbon or graphite is highly effective in avoiding thermal precipitation of fine solid silicon particles on the inlet surfaces and ensuing clogging of the inlet tube and the narrow septum 44 itself. Experience has shown that during the "priming" stage of the operation of the reactor apparatus 10, the septum 44 too reacts with the newly-formed liquid silicon to form silicon carbide, without impairing its emissivity.

The inlet tube assembly 22 of the reactor apparatus of the present invention operates without clogging. In contrast with the prior art inlet assembly disclosed in the above-noted U.S. patent application Ser. No. 126,063, now U.S. Pat. No. 4,343,772 the internal diameter of the inlet tube 36 may be quite substantial. In the herein-described specific example wherein the length of the reactor is 157 cm, the internal diameter of the inlet tube 36 is approximately 1 cm, and the inside diameter of the abutting septum 44 is approximately 1 cm. The outside diameter of the septum 44 is 2.2 cm and its thickness is about 0.3 cm.

Dwelling time of the silane gas in the heated reactor 32 is selected in such a manner that the silane-to-liquid silicon reaction proceeds to substantially reach thermodynamic equilibrium which favors complete decomposition. During the process, the silane gas and the by-product hydrogen gas flow in a substantially smooth, substantially unperturbed flow, substantially axially in the reactor 32. The lower, reservoir portion of the reactor 32, containing molten silicon 20, is kept at a temperature exceeding the melting temperature of silicon. The molten silicon may be continuously drained out of the reactor apparatus 10 through the outlet duct assembly 26 which may be constructed in accordance with state of the art. The by-product hydrogen gas leaves the reactor 32 through the hydrogen outlet duct assembly 24 which is located on a side wall of the reactor 32 above the level of molten silicon 20. Assembly 24 is located near the bottom of the reactor 32 (above the maximum level of molten silicon 20) so that gas flow is essentially from top to bottom. Alternatively, the gas outlet tube may extend upward from the bottom of the reactor through the pool of molten silicon.

EXAMPLE 1

Four runs were made in which silane gas was fed out of room temperature storage through a cooled inlet tube and into a reactor, as described in U.S. Pat. No. 4,343,772. In all four runs, the reactor temperature was between 1600° and 1700° C. In the first three runs, the entry gas was 100% silane flowing at 0.1 cfm STP; in the fourth run, the gas was 20% silane, 80% hydrogen, at 0.25 cfm STP. Accordingly, gas discharge velocity from the inlet tube into the reactor varied from about 100 to 250 fps. Within the reactor, the positions of inlet tube and vortex finder were varied over the four runs and included the preferred positions of U.S. Pat. No. 4,343,772.

In each run, operation was terminated after 5 minutes due to excessive inlet gas pressure caused by complete or almost complete plugging of the exit of the inlet tube, as determined by pressure increase and confirmed later by visual examination. The inlet tube exit tip was seen covered with a plug, which was a gray, poorly consolidated mass of silicon, typically about 4 millimeters in length extending from the tip and weighing about 1 gram. Furthermore, the terminated runs were found to be near to failure due to a second cause accumulation of a fine yellowish brown silicon powder in the vortex finder at its first constriction just above the reactor. Also, the top of the reactor, upon cooling, showed incipient cracks radiating from the off-center inlet tube.

In all the runs, there was no evidence of silicon collection at the bottom of the reactor, but there was some indication of conversion of graphite to silicon carbide at the reactor wall near the vortex finder, as shown by increased abrasion resistance. In the fourth run, brown silicon powder was recovered from the exit lines; and a mass balance was taken, which indicated that all of the silane had been decomposed and most of it converted to the brown silicon powder.

The loss of silicon powder was attributed to the location of the vortex finder near the top of the reactor where silicon particles initially form. At this location, the vortex finder can have a large tendency to sweep out freshly formed submicron powder entrained in the gas stream.

EXAMPLE 2

A gas composed of 20% silane and 80% hydrogen was provided to a vertical graphite reactor as described above for the invention and shown in the drawing figures, except that the reactor chamber was abbreviated to length 21 cm by 5 cm internal diameter, and except that a 1.9 cm-ID outlet tube extended axially downward out of the reactor from an open end 2 inches above the chamber bottom (to allow a pool of molten silicon to form at the chamber bottom and at the same time to allow the axisymmetric downward flow and discharge of gases and entrained powder through the outlet tube).

The silane/hydrogen mixture flowed into the reactor chamber from room temperature storage through a cooled, vertical inlet tube and through a 0.3 cm-thick porous carbon septum. The inlet tube had a 1.0 cm diameter gas flow channel, and the septum had a 1.0 cm central hole diameter—a very significant difference from the 0.16 cm-diameter of the aperture of the inlet tube of U.S. Pat. No. 4,343,772. One face of the septum concentrically abutted the flat end face of the inlet tube. The other face of the septum was central and flush with the top wall of the reactor. Emissivities of both the septum and the reactor wall were well above 0.9. The silane/hydrogen mixture flowed through inlet tube and septum at 0.25 cfm STP (at a velocity of about 5 fps) and entered the reaction chamber, which was heated by an external graphite resistance heater to about 1650° C. In the reactor, the silane decomposed completely (as evidenced by the color and luminosity of a burn-off flame indicator at the exit of the apparatus); and hydrogen and entrained silicon powder entered the outlet tube and exited the bottom of the reactor.

The run was discontinued after 20 minutes because of increased pressure downstream of the reactor due to deposition of powdered silicon in the lines. This escape of most of the powdered silicon from the reactor was to be expected since the test reactor chamber was only 21 cm long, and the effective reaction length was only 15 cm—a small segment actually of the preferred embodiment, which has been given as 157 cm in length by 7.5 cm ID. At full design length (157 cm, compared to 21 cm) no powdered silicon is expected to escape. In essence, the dwell time in the abbreviated reactor, about one second, was insufficient to accomplish completely the sequential steps of silane heating, pyrolysis, silicon powder generation, nucleation, particle growth, heating and melting. Nevertheless, the weight of the reactor increased by 10.1 grams due to in situ conversion of the graphite wall to silicon carbide, showing that "priming" of the reactor for liquid silicon collection was readily taking place.

The reactor was cooled, disassembled and inspected. The septum was clear, and there was no evidence of silicon powder deposit anywhere in the reactor. This 20-minute run conclusively demonstrated a plug-free inlet operation.

It is thus seen that no change in length, shape, size, or operating conditions of the cyclone-type reactor of U.S. Pat. No. 4,343,772 can prevent the loss of submicron silicon powder such as we have due to the vortex finder influence of the gas stream in the prior art device. In comparison, the reactor of the invention can be operated with adequate dwell time of the silane gas by appropriately sizing the reactor to avoid any loss of submicron silicon powder by completely melting the silicon.

Principal advantages of the above-described reactor apparatus and process of the present invention include the following. The reactor 32 is readily manufactured of relatively inexpensive pure carbon or graphite material, and yet readily "primes" or converts itself to eventually expose only non-contaminating silicon carbide for contact with the highly pure, solar grade silicon. The reactor is capable of continuous, trouble-free operation, is not subject to clogging due to buildup of solid silicon material, and does not require continuous scraping or clearing operation to keep the walls free of deposited hard crust of silicon.

The above-described specific embodiment of the reactor apparatus 10 is capable of producing several kilograms (up to 15 kg) of solar grade molten silicon per hour. For a still larger scale silicon producing plant a still larger embodiment of the reactor apparatus 10 of the present invention may be utilized. Alternatively, and preferably, several reactors of approximately of the above-noted specific dimensions may be operated simultaneously.

Furthermore, and preferably in small versions of the reactor, the molten silicon chemically obtained in the process of the present invention may be directly fed into a Czochralski or other crystal shaping apparatus (not shown), eliminating the need for remelting of solid silicon. The energy saving thereby is considerable. Alternatively, the molten silicon may be used to produce castings for later remelt and replenishment of Czochralski or other apparatus.

Several modifications of the above-described apparatus and process may become readily apparent to those skilled in the art in light of the above disclosure. Therefore, the scope of the present invention should be interpreted solely from the following claims.

I claim:

1. A process for directly producing molten silicon by thermal decomposition of silane in a reaction chamber, said process comprising the steps of:
   (a) maintaining a feed gas comprising said silane and hydrogen in a first temperature range below the thermal decomposition temperature of said silane,
   (b) maintaining said reaction chamber in a second temperature range above the melting point of silicon;
   (c) abruptly raising the temperature of said feed gas from said first temperature range to said second temperature range by introducing said feed gas into said reaction chamber from a cooled inlet means having a terminal orifice located outside said reaction chamber through an insulating, porous carbon septum about 0.1 to 1.0 cm thick and having a matching orifice of a diameter in the range of 0.5–3 cm. said septum having one face against said cooled inlet means and having the opposite face exposed to said reaction chamber so that said silane in said feed gas remains undecomposed until entering said reaction chamber;
   (d) maintaining a substantially smooth, axial, downward flow of said feed gas in the reaction chamber while permitting said silane to undergo thermal decomposition to yield molten silicon;

(e) removing unreacted feed gas and by-product gas from the reaction chamber; and (f) recovering molten silicon from the reaction chamber.

2. The process of claim 1 wherein said carbon septum has an emissivity of at least about 0.90.

3. The process of claim 1 wherein the second temperature range is approximately 1500°–1800° C.

4. The process of claim 3 wherein the second temperature range is approximately 1600°–1800° C.

5. The process of claim 1 wherein the first temperature range is below 1000° C.

6. The process of claim 1 wherein said cooled inlet means is a tube.

7. The process of claim 1 wherein said septum is located in the top center of said reactor.

8. The process of claim 1 wherein said feed gas stream is introduced into said reaction chamber at about 1.0 to 50.0 feet per second.

9. The process of claim 8 wherein said feed gas stream is introduced into said reaction chamber at about 3.0 to 10.0 fps.

* * * * *

UNITED STATES PATENT AND TRADEMARK OFFICE
CERTIFICATE OF CORRECTION

PATENT NO. : 4,668,493
DATED : MAY 26, 1987
INVENTOR(S) : Harry Levin

It is certified that error appears in the above-identified patent and that said Letters Patent is hereby corrected as shown below:

Column 1, line 42, "($SiC_4$)" should read -- ($SiCl_4$) --.

Signed and Sealed this

Eighth Day of September, 1987

Attest:

DONALD J. QUIGG

Attesting Officer

Commissioner of Patents and Trademarks